United States Patent
Kawakami et al.

(10) Patent No.: US 7,554,213 B2
(45) Date of Patent: Jun. 30, 2009

(54) LOAD CONTROL MECHANISM FOR SELF-PROPELLED WORKING MACHINE

(75) Inventors: Toshiaki Kawakami, Saitama (JP); Hiroshi Kobayashi, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 252 days.

(21) Appl. No.: 11/751,955

(22) Filed: May 22, 2007

(65) Prior Publication Data
US 2007/0273152 A1 Nov. 29, 2007

(30) Foreign Application Priority Data
May 24, 2006 (JP) .............................. 2006-144085

(51) Int. Cl.
*B60L 11/02* (2006.01)
*F02N 11/06* (2006.01)
(52) U.S. Cl. ........................... 290/40 R; 290/51; 290/7
(58) Field of Classification Search ................... 290/27, 290/40 R, 7, 38 R, 51; 322/44, 28; 123/2, 123/3, 319, 335, 179.1
See application file for complete search history.

(56) References Cited

U.S. PATENT DOCUMENTS

| | | | | |
|---|---|---|---|---|
| 4,531,489 A | * | 7/1985 | Sturdy | 123/320 |
| 7,134,261 B2 | * | 11/2006 | Inui et al. | 56/14.7 |
| 7,487,608 B2 | * | 2/2009 | Yamazaki et al. | 37/245 |
| 2004/0169481 A1 | * | 9/2004 | Wakitani et al. | 318/376 |
| 2004/0227348 A1 | * | 11/2004 | Wakitani et al. | 290/31 |
| 2005/0057226 A1 | * | 3/2005 | Kawakami et al. | 322/24 |

FOREIGN PATENT DOCUMENTS

JP 3-32617 U 3/1991

* cited by examiner

*Primary Examiner*—Julio Gonzalez
(74) *Attorney, Agent, or Firm*—Westerman, Hattori, Daniels & Adrian, LLP.

(57) ABSTRACT

A self-propelled working machine, which performs work by using power of an internal combustion engine 10 and travels by using power of an electric motor 30, includes a mechanical governor 75 for maintaining the engine at a designated engine rotational speed Nf. A load control mechanism for the working machine has a maximum working output calculator that calculates a maximum working output Qf from the designated engine rotational speed, an actual working load calculator that calculates an actual working load Qr from the designated engine rotational speed Nf and a detected actual engine rotational speed Nr, and a limit speed calculator that calculates a limit speed Vc from the maximum working output Qf and the actual working load Qr. A travel controller operates and controls the electric motor 30 by setting a travel speed V to the limit speed Vc when the actual engine rotational speed Nr is decreased to be lower than the designated engine rotational speed Nf. The travel speed of the working machine is automatically controlled so that the working load is calculated from the driving condition of the internal combustion engine to ensure the working load to be appropriate. Thus excellent finish of the working is maintained and the operator is relieved from burden.

4 Claims, 14 Drawing Sheets

-○- PRESENT DESIGNATED SPEED V

-△- DESIGNATED SPEED V' AFTER PROCESS
    (PREVIOUS ACTUAL SPEED Vr)

ADDITION LIMIT VALUE dVa:2

SUBTRACTION LIMIT VALUE dVs:3

Fig.14
(1)
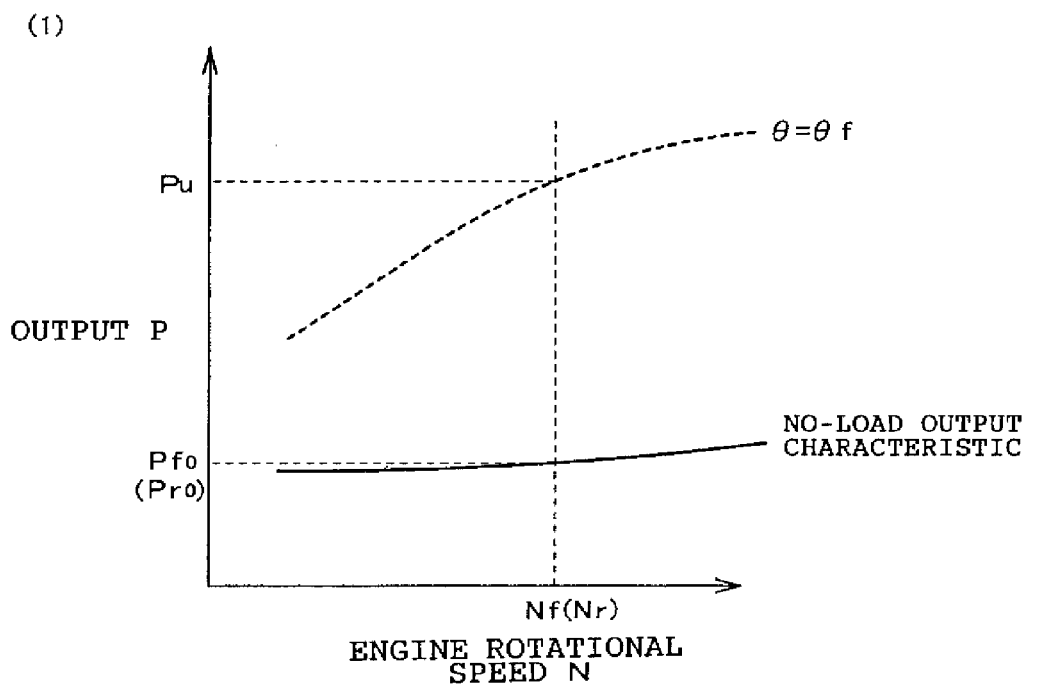
(2)
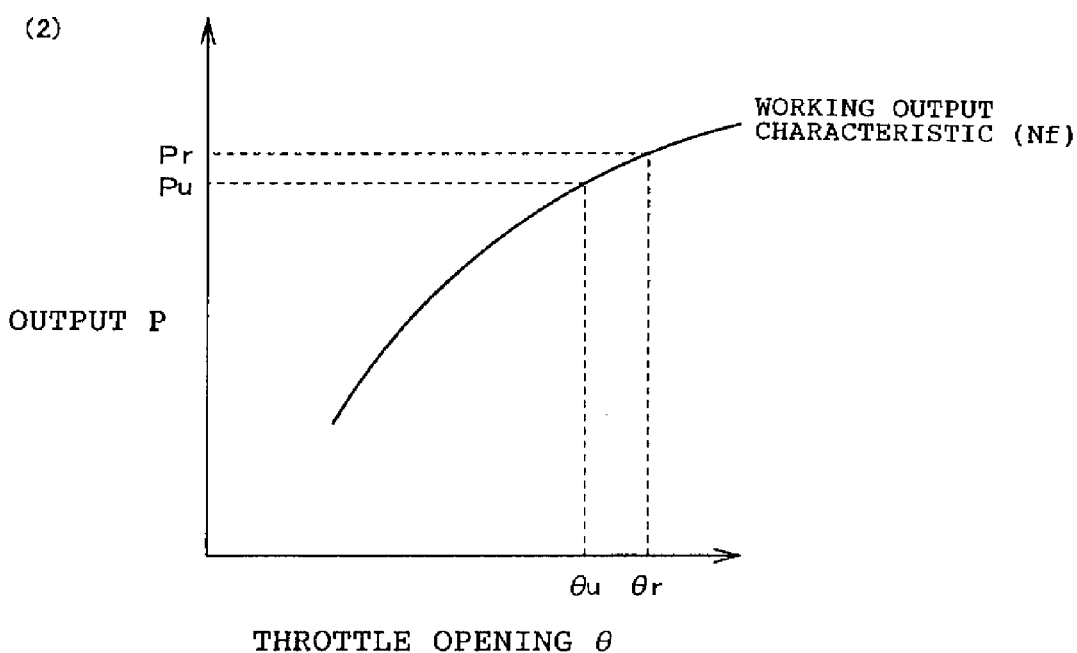

LOAD CONTROL MECHANISM FOR SELF-PROPELLED WORKING MACHINE

BACKGROUND OF THE INVENTION

1. Field of the Invention

The present invention relates to a self-propelled working machine, such as a lawn mower, that performs work by using power of an internal combustion engine and travels by using power of an electric motor, and more particularly, to a self-propelled working machine of which travel is controlled in response to working load.

2. Description of the Related Art

In self-propelled working machines, in general, working load increases when travel speed is high during the working, and working load decreases when travel speed is low.

In such self-propelled working machines that perform work by using an internal combustion engine, if working conditions are bad and working load is too large, it is not possible to perform the work at optimum output and the finish of the work deteriorates, or engine stall occurs. For this reason, the operator determines the degree of the working load by hearing working sounds or observing the finish. When it is determined that the working load is increased, the operator reduces the travel speed and thus suppress the load to maintain excellent finish of the work so that the internal combustion engine does not stop running (engine stall does not occur).

As described above, the operator must control the speed while observing working conditions. For this reason, operator's work burden is increased. Therefore, the operator should have proficiency in operating the working machine.

There has been proposed a snowplow in JP-UM-A-3-32617. In the snowplow, a blower and an auger are driven to remove snow by an internal combustion engine and the snowplow travels by the internal combustion engine. The travel speed of the snowplow is controlled and the rotational speed of the blower is also controlled in response to working load.

According to the snowplow disclosed in JP-UM-B-3-32617, one internal combustion engine performs the drive of the blower plow and so one, and the engine rotational speed of the engine has an influence on the travel speed. Further, since the blower and wheels are two objects to be controlled, the snowplow includes separate control actuators for these objects. For this reason, the structure of the snowplow including the driving mechanisms is complicated, and the control thereof is complex, thereby increasing the overall cost.

SUMMARY OF THE INVENTION

The invention has been made to solve the problems, and it is an object of the invention to provide a load control mechanism for a self-propelled working machine. According to the load control mechanism, in a self-propelled working machine that performs work by using power of an internal combustion engine and travels by using power of an electric motor, the travel speed is automatically controlled in such a manner that the working load is calculated from the driving condition of the internal combustion engine to ensure the working load to be appropriate, so that the operator can maintain excellent finish of the work and is relieved from work burden by using a simple control.

In order to achieve the object, according to an aspect of the invention, there is provided a load control mechanism for a self-propelled working machine that performs work by using power of an internal combustion engine, travels by using power of an electric motor, and includes a governor for maintaining the internal combustion engine at a designated engine rotational speed, wherein: the governor is a mechanical governor that mechanically controls a throttle opening of the internal combustion engine; and the load control mechanism comprises: a maximum working output calculating means that calculates a maximum working output from the designated engine rotational speed; an actual working load calculating means that calculates an actual working load from the designated engine rotational speed and a detected actual engine rotational speed; a limit speed calculating means that calculates a limit speed from the maximum working output and the actual working load; and a travel controller that operates and controls the electric motor by setting a travel speed to the limit speed when the actual engine rotational speed is decreased to be lower than the designated engine rotational speed.

According to this aspect of the invention, the limit speed is calculated from the maximum working output, which is calculated from the designated engine rotational speed by the maximum working output calculating means, and the actual working load, which is calculated from the designated engine rotational speed and the actual engine rotational speed by the actual working output calculating means. When the actual engine rotational speed is decreased to be lower than the designated engine rotational speed, the electric motor is operated and controlled by setting a travel speed to the limit speed. The travel speed is thus automatically controlled so that the working load become appropriate, and the operator can maintain excellent finish of the work and is relieved from work burden by using the simple structure and control.

In the above-mentioned load control mechanism for the self-propelled working machine, the maximum working output calculating means and the actual working load calculating means may previously store a no-load output characteristic, which is a relationship between engine rotational speed and no-load output during no-load driving, and a working output characteristic, which is a relationship between engine rotational speed and working output for every designated engine rotational speed during working. Further, the maximum working output calculating means and the actual working load calculating means may calculate the maximum working output and the actual working load on the basis of the no-load output characteristic and the working output characteristic.

According to the load control mechanism, the no-load output characteristic, which is a relationship between engine rotational speed and no-load output during no-load driving, and the working output characteristic, which is a relationship between the engine rotational speed and working output for every designated engine rotational speed during working, are previously stored. Therefore, it is possible to easily and quickly calculate the maximum working output and the actual working load.

According to another aspect of the invention, there is provided a load control mechanism for a self-propelled working machine that performs work by using power of an internal combustion engine, travels by using power of an electric motor, and includes a governor for maintaining the internal combustion engine at a designated engine rotational speed (Nf), wherein: the governor is an electronic governor that electronically controls a throttle opening of the internal combustion engine; and the load control mechanism comprises: a maximum working output calculating means that calculates a maximum working output from an upper limit throttle opening and the designated engine rotational speed; an actual working load calculating means that calculates an actual working load from the designated engine rotational speed and a detected actual throttle opening; a limit speed calculating means that calculates a limit speed from the maximum working output and the actual working load; and a travel controller that operates and controls the electric motor by setting a travel speed to the limit speed when the actual throttle opening is increased to be equal to or higher than the upper limit throttle opening.

According to this aspect of the invention, the limit speed is calculated from the maximum working output, which is calculated from the designated engine rotational speed and the upper limit throttle opening by the maximum working output calculating means, and the actual working load, which is calculated from the designated engine rotational speed and the actual throttle opening by the actual working output calculating means. When the actual throttle opening is increased to be equal to or higher than the upper limit throttle opening, the electric motor is operated and controlled by setting a travel speed to the limit speed. For this reason, the travel speed is automatically controlled so that the working load become appropriate, and the operator can maintain excellent finish of the work and is relieved from work burden by using the simple structure and control.

In the above-mentioned load control mechanism for the self-propelled working machine, the maximum working output calculating means and the actual working load calculating means may previously store a no-load output characteristic, which is a relationship between engine rotational speed and no-load output during no-load driving, and a working output characteristic, which is a relationship between throttle opening and working output for every designated engine rotational speed during working. Further, the maximum working output calculating means and the actual working load calculating means may calculate the maximum working output and the actual working load on the basis of the no-load output characteristic and the working output characteristic.

According to the load control mechanism, the no-load output characteristic, which is a relationship between engine rotational speed and no-load output during no-load driving, and the working output characteristic, which is a relationship between the throttle opening and the working output for every designated engine rotational speed during working, is previously stored. Therefore, it is possible to easily and quickly calculate the maximum working output and the actual working output.

BRIEF DESCRIPTION OF THE DRAWINGS

FIG. 14 shows a graph of a no-load output characteristic shown in rectangular coordinates, and a graph of a working output characteristic shown in rectangular coordinates.

DESCRIPTION OF THE PREFERRED EMBODIMENTS

An embodiment according to the invention will be described below with reference to FIGS. 1 to 12.

A lawn mower 1 according to this embodiment is a hybrid self-propelled lawn mower that can rotate mowing blades 12 (see FIG. 2) by a four-stroke cycle internal combustion engine 10 to perform a mowing operation and can self-travel by a travel DC motor 30.

Figure 1:
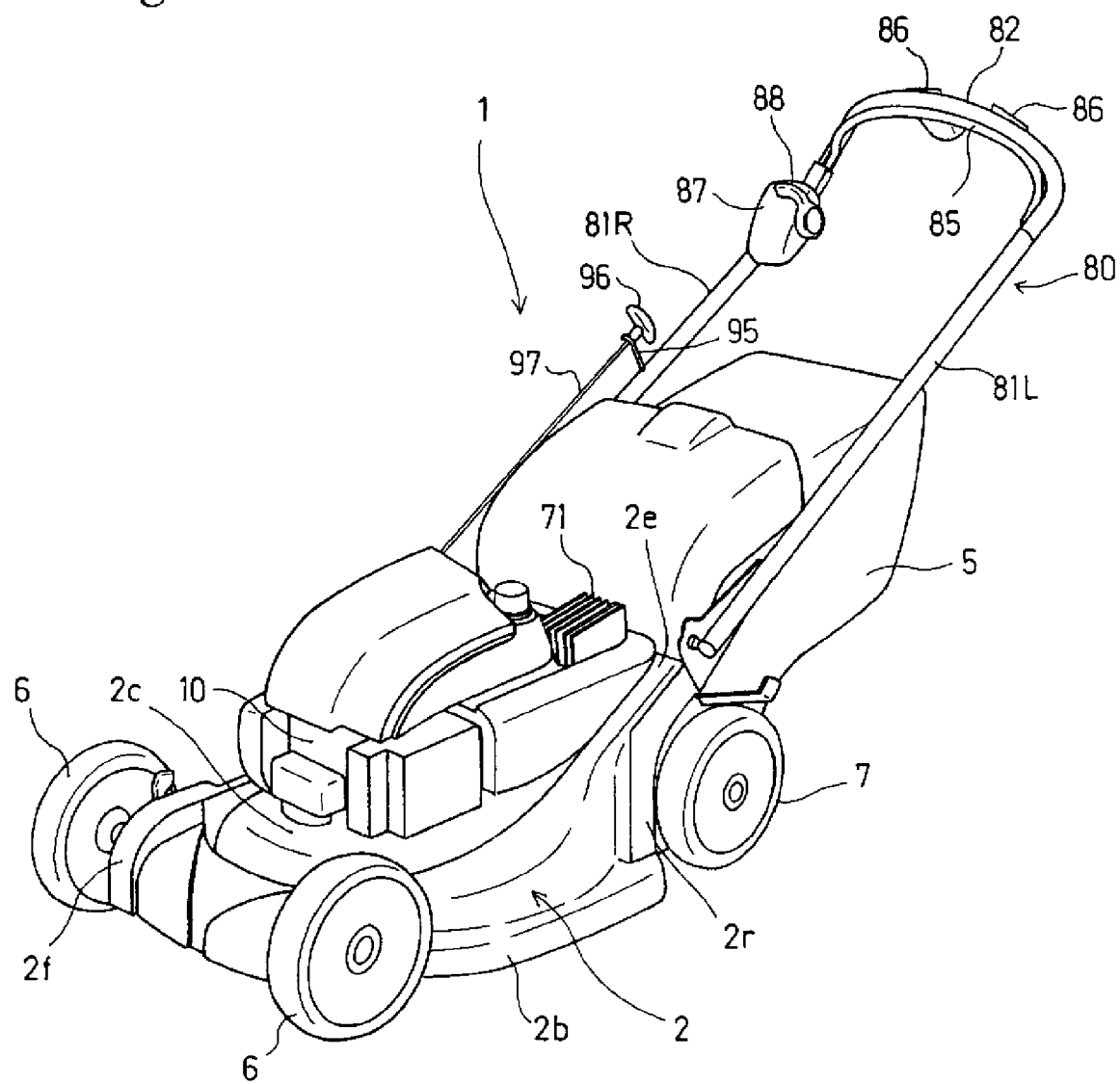
FIG. 1 is a perspective view showing an entire lawn mower to which a load control mechanism according to the invention is applied.
Figure 2:
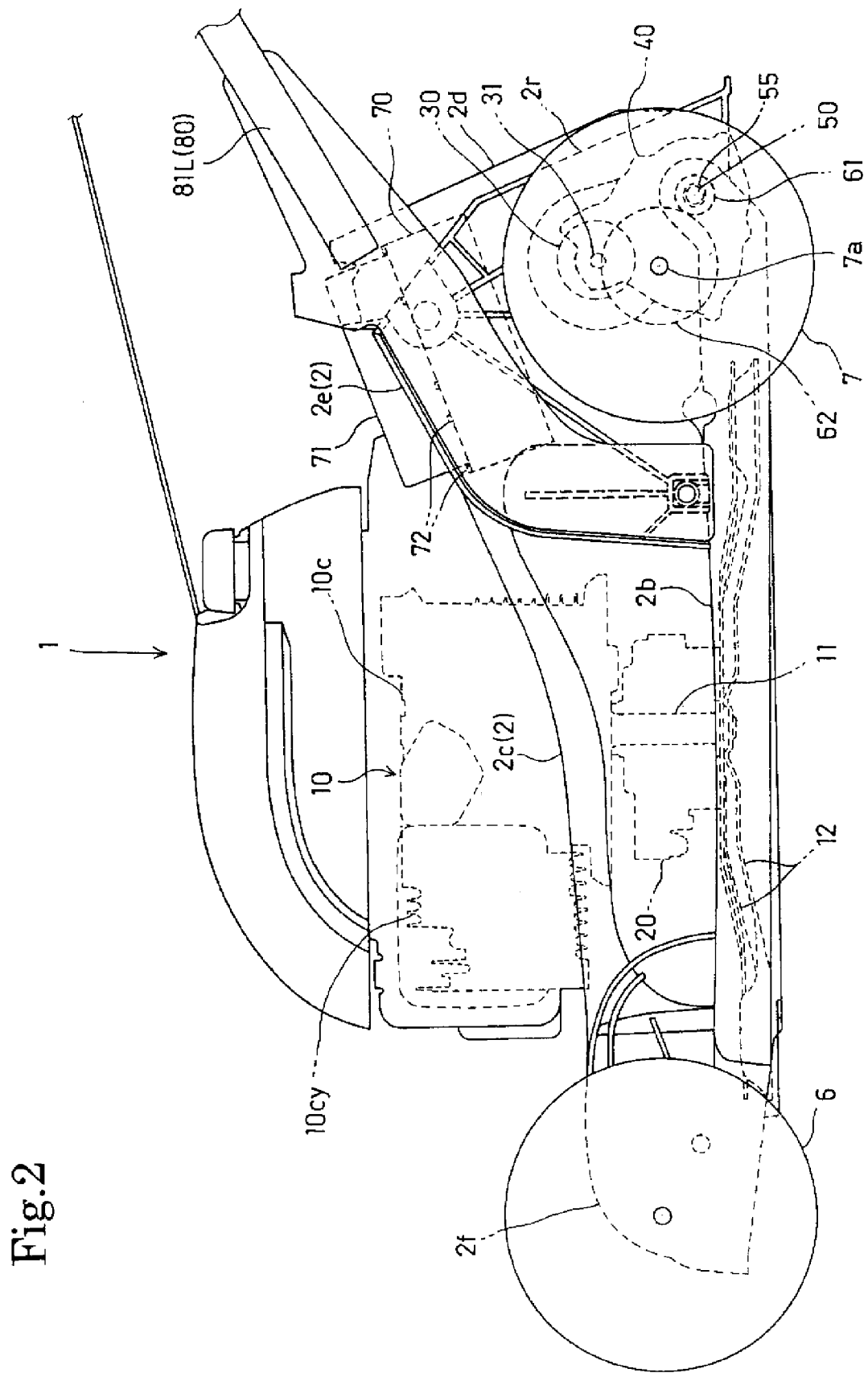
FIG. 2 is a side view of a body of the lawn mower.
Figure 3:
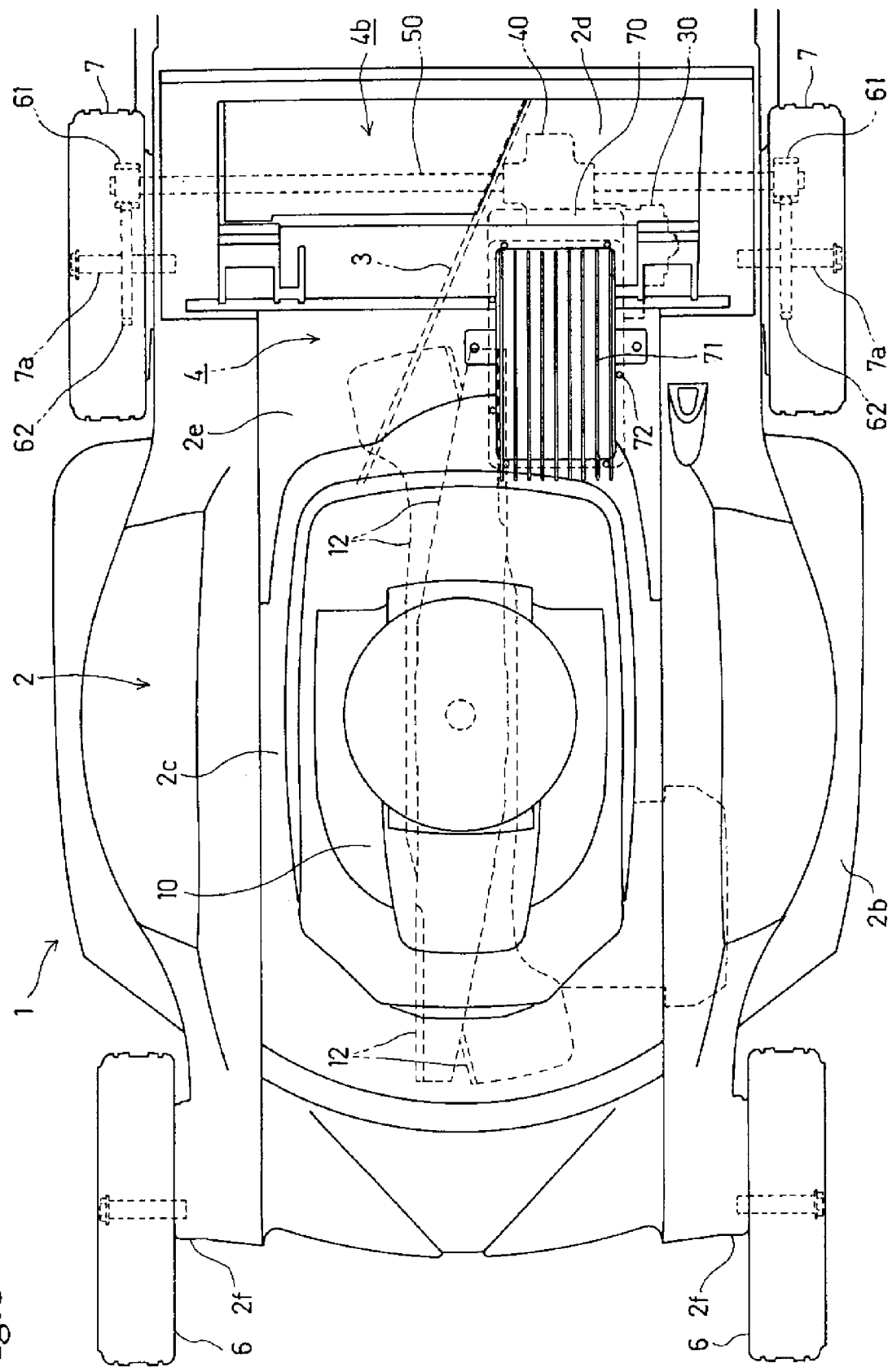
FIG. 3 is a plan view of the body of the lawn mower.
Figure 4:
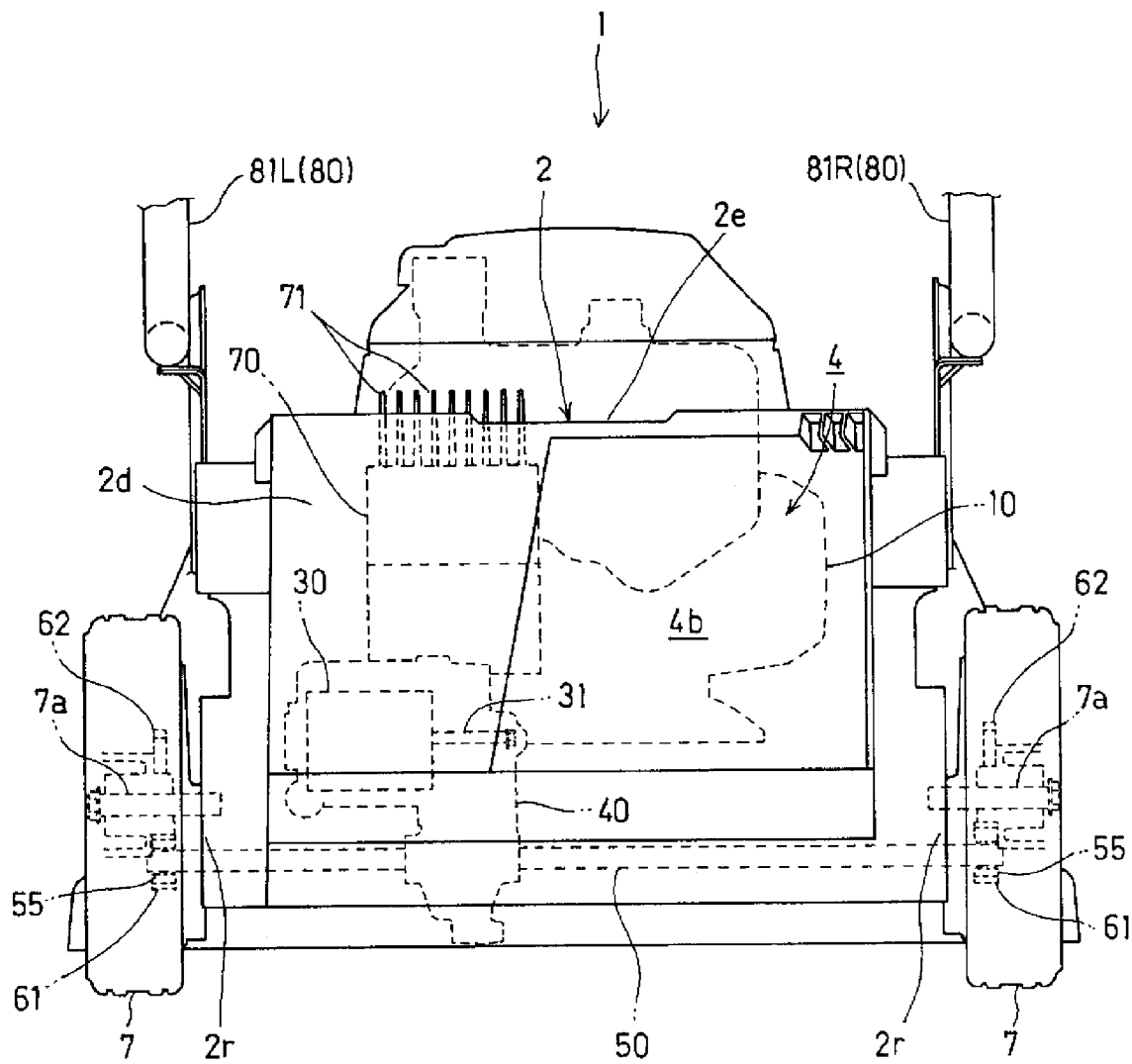
FIG. 4 is a rear view of the body of the lawn mower.

FIG. 1 shows a perspective view showing the entire lawn mower 1, FIG. 2 shows a side view of a body of the lawn mower, FIG. 3 is a plan view of the body of the lawn mower, and FIG. 4 is a rear view of the body of the lawn mower.

Referring to FIG. 1, a blade housing 2, which supports the mowing blades 12 (see FIG. 2) rotating above the ground and covers the blades from above, is supported by a pair of (left and right) front wheels 6 and 6 and rear wheels 7 and 7 so as to freely travel on the ground.

A direction in which the lawn mower 1 moves forward will be referred as a forward direction in the description, and the front, the rear, the left, and the right are determined on the basis of the above-mentioned direction.

Bearing portions 2f, 2f, 2r, and 2r, which support four shafts of the front and rear wheels 6, 6, 7, and 7, are provided at four corners of the blade housing 2. Further, the lower portion of a central portion 2c, which is surrounded by the bearing portions 2f, 2f, 2r, and 2r, of the blade housing 2 is formed to have the shape of a flat bowl, thereby forming a blade receiving portion 2b covering the blades 12. The rear half portion of the central portion 2c is expanded upward toward the rear side thereof, thereby forming an expansion portion 2e that is continuous to the rear side and expanded upward.

An internal combustion engine 10 is provided in the central portion 2c of the blade housing 2 so that a crankshaft 11 (see FIG. 2) is oriented in a vertical direction. In the internal combustion engine 10, cylinders 10cy are oriented toward the front side, and the crankshaft 11 protrudes downward from within a crank case 10c.

Figure 5:
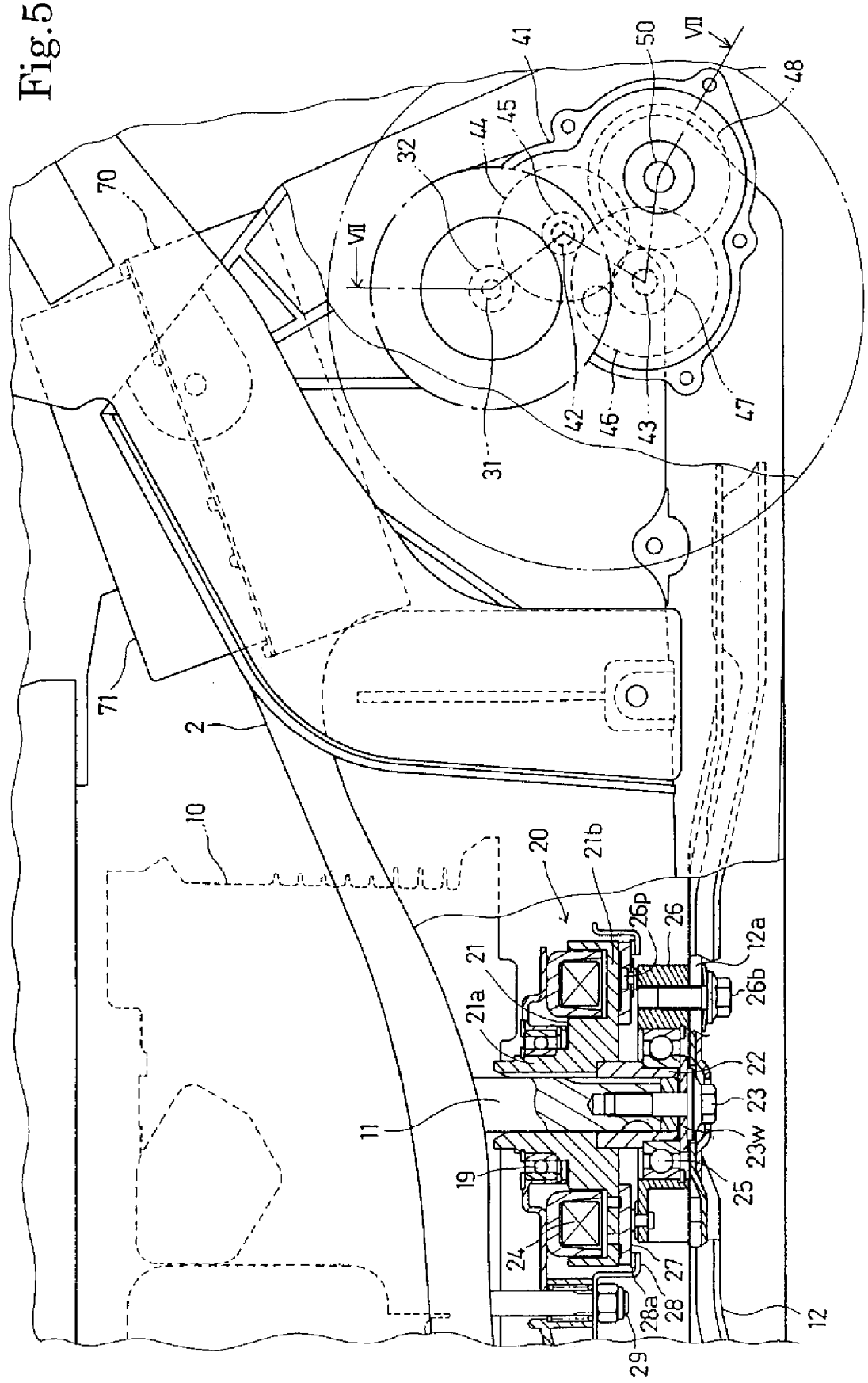
FIG. 5 is a side view, partly in section, of the lawn mower in which a part of the lawn mower is omitted.

As shown in FIG. 5, an electromagnetic clutch 20 is provided between the crankshaft 11 and the blades 12. Accordingly, if the electromagnetic clutch 20 is engaged during the operation of the internal combustion engine 10, the blades 12 are rotated. As a result, it is possible to perform the mowing operation.

A vertical partition plate 3 (see FIG. 3) is obliquely provided throughout from the right side of the central portion 2c to the expansion portion 2e at the posterior half of the blade housing 2. Further, the inside of the blade housing 2 is partitioned by the vertical partition plate 3, so that a lawn conveying passage 4 is formed.

The lawn conveying passage 4 is a passage, which is formed by partitioning the inside of the blade housing 2. The front end of the passage is opened to the blade receiving portion 2b, and the cross-sectional area of the passage is gradually increased from a front opening toward the rear side thereof. For this reason, a large rear opening 4b (see FIGS. 3 and 4) is formed in the rear wall, which is slightly inclined, of the expansion portion 2e.

The rear opening 4b of the lawn conveying passage 4 is largely opened to occupy an area larger than the right half portion of the rear wall 2d of the expansion portion 2e, and the front opening is connected to the rear opening 4b. A lawn collecting bag 5 shown in FIG. 1 is connected to the rear opening 4b to extend toward the rear.

The inside of the blade housing 2 is partitioned by the inclined vertical partition plate 3, so that the lawn conveying passage 4 is formed at the right portion in the blade housing. Further, a travel DC motor 30 and a speed reduction mechanism 40 are provided in a lower half of a left-side space, which is partitioned by the vertical partition plate 3.

As shown in FIG. 4, a motor driving shaft 31 of the travel DC motor 30 is disposed in the upper portion of the speed reduction mechanism 40, as an input shaft of the speed reduction mechanism 40. Further, the torque of the motor driving shaft 31 is transmitted to a driving shaft 50, which serves as an output shaft provided in the lower portion of the speed reduction mechanism 40, through the engagement of reduction gears at a reduced speed.

Figure 6:
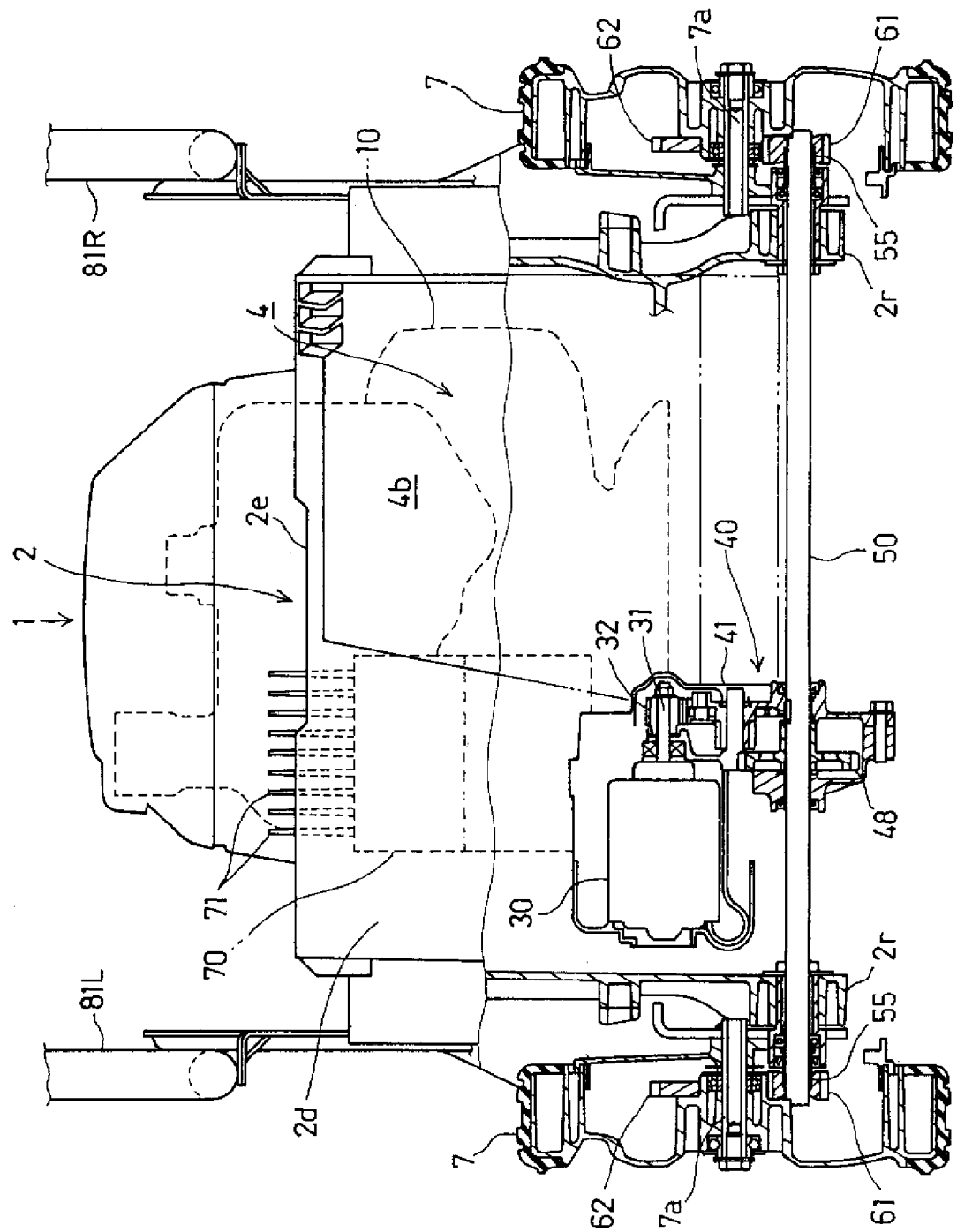
FIG. 6 is a rear view, partly in section, of the lawn mower in which a part of the lawn mower is omitted.

As shown in FIGS. 4 and 6, the driving shaft 50 extends in the left-and-right or transverse direction and is rotatably provided on the rear side of rear axles 7a and 7a by which the rear wheels 7 and 7 are rotatably supported. Further, driving gears 61 and 61, which are fitted to both ends of the driving shaft 50 with two-way or bi-directional clutches 55 interposed therebetween, are engaged with driven gears 62 and 62, which are integrally fixed to the rear wheels 7 and 7.

Accordingly, the torque of the motor driving shaft 31 of the travel DC motor 30 is transmitted to the driving shaft 50 through the speed reduction mechanism 40 at a reduced speed, and the torque of the driving shaft 50 is transmitted to the rear wheels 7 and 7 through the two-way or bi-directional clutches 55 and the engagement between the driving and driven gears 61, 61, 62, and 62. Therefore, the lawn mower 1 travels.

The two-way or bi-directional clutch is a clutch by which only forward driving torque of the driving shaft of the driving source is transmitted to the driving wheel while both forward and backward torques of the driving wheels are not transmitted to the driving shaft if the clutch is not engaged or in disengaged state.

The operation control of the travel DC motor 30, the operation control of the internal combustion engine 10, and the engagement and disengagement control of the electromagnetic clutch 20, which transmits the power of the internal combustion engine 10 to the blades 12, are performed by an ECU 70 (see FIGS. 2 and 4), which is an electronic control unit using a computer.

The ECU 70 is provided in an upper half of the left space of the lawn conveying passage 4, which left space is partitioned by the vertical partition plate 3 at the upper portion of the rear expansion portion 2e of the blade housing 2. The travel DC motor 30 is provided on the lower side of the ECU 70. The ECU 70 is received in a case having a rectangular parallelepiped shape, and a plurality of cooling fins 71 protrude in line from the upper surface of the case.

An inclined upper wall of the rear expansion portion 2e of the blade housing 2 is partially opened so that a rectangular opening is formed, and the rectangular opening is slightly smaller than the rectangular upper surface of the case of the ECU 70. As shown in FIG. 3, the cooling fins 71 are inserted into the rectangular opening from below so as to be exposed to the upper side. Further, the outer edges of the upper surface of the case of the ECU 70 come in contact with the edges of the rectangular opening, and are fixed to the edges of the rectangular opening with screws 72. Accordingly, the ECU 70 is supported on the upper wall of the blade housing 2.

Figure 7:
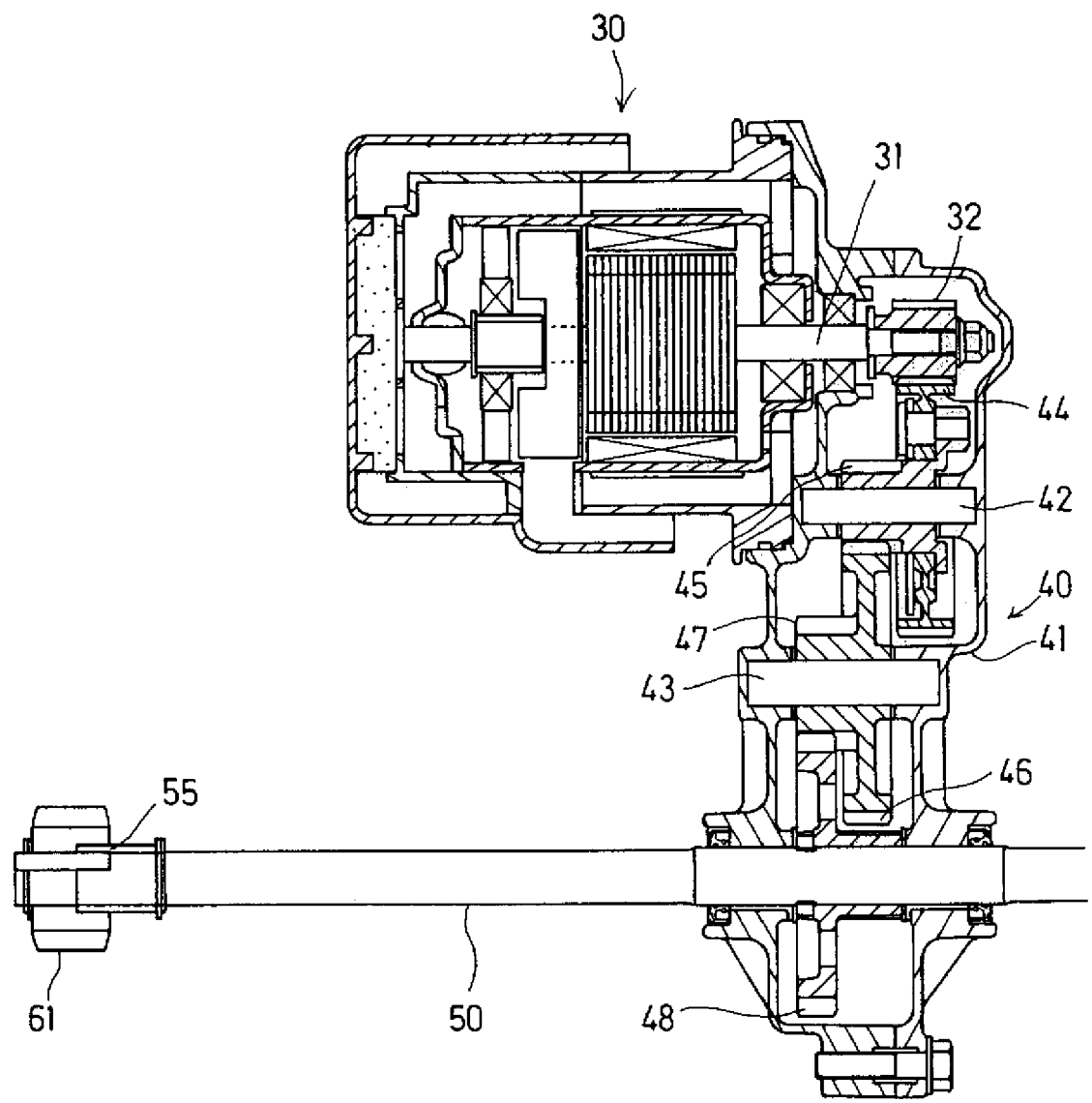
FIG. 7 is a sectional view of a travel DC motor and a speed reduction mechanism, taken along line VII-VII of FIG. 5.

A power transmission system will be described below with reference to FIGS. 5 to 7.

First, the structure of the electromagnetic clutch 20, which transmits the power of the internal combustion engine 10 to the blade 12, will be described with reference to the sectional view of FIG. 5.

A rotary disk 21 is serration-fitted from below to the crankshaft 11, which protrudes downward from the internal combustion engine 10. In addition, a cylindrical collar 22 is fitted to the crankshaft 11 and then integrally fixed to the crankshaft 11 by using a flange bolt 23 with a washer 23w interposed therebetween. Accordingly, the crankshaft 11 and the rotary disk 21 rotate as a single body.

The rotary disk 21 is composed of a cylindrical portion 21a supported by a bearing 19 and a disk portion 21b formed at the lower end of the cylindrical portion. Further, the upper portion of an annular electromagnetic coil 24 is held, so that an annular electromagnetic coil 24 is suspended close to the upper surface of the disk portion 21b.

An annular blade supporting member 26 is provided on the outer peripheral surface of the collar 22 with a bearing 25 interposed therebetween so as to freely rotate relative to the crankshaft 11. Further, an annular base end 12a of the blades 12 comes in contact with the lower surface of the annular supporting member 26, and integrally fixed to the lower surface with a flange bolt 26b. Therefore, the blades 12 are supported to freely rotate with respect to the crankshaft 11.

A hollow disk-shaped clutch disk 27 is supported on the blade supporting member 26 so as to move up and down. That is, a plurality of pins 26p, which stands on the upper surface of the blade supporting member 26, passes through the clutch disk 27. The clutch disk 27 moves up and down with respect to the blade supporting member 26, but has the structure in which the rotation of the clutch disk 27 with respect to the blade supporting member 26 is limited.

The clutch disk 27 is close to the disk portion 21b of the rotary disk 21 and faces the disk portion. When moved upward, the clutch disk 27 comes in contact with the disk portion 21b. A friction member is attached to the portion, which comes in contact with the disk portion 21b of the rotary disk 21, of the upper surface of the clutch disk 27.

Further, an annular locking plate 28, which is fixed to the blade housing 2 with a bolt 29, is supported below the outer edge of the lower surface of the clutch disk 27. Friction members 28a are attached in an annular shape on the upper surface of the annular locking plate 28.

The electromagnetic clutch 20 has the above-mentioned structure. When current is not supplied to the electromagnetic coil 24 and the electromagnetic coil is demagnetized, the clutch disk 27 moves downward to be separated from the rotary disk 21. For this reason, although the crankshaft 11 and the rotary disk 21 rotate due to the driving of the internal combustion engine 10, power is not transmitted to the blade supporting member 26 and the blades 12 thus do not rotate.

Meanwhile, when current is supplied to the electromagnetic coil 24 and the electromagnetic coil is energized, the clutch disk 27 moves upward to be attached to the rotary disk 21 due to the magnetic force. For this reason, the torque of the crankshaft 11 causes the rotary disk 21 and the clutch disk 27 to rotate as a single body, and the torque of the clutch disk 27 is transmitted to the blade supporting member 26 through the pins 26p. Therefore, the blades 12 rotate.

In this case, when the electromagnetic coil 24 is deenergized, the clutch disk 27 is separated from the rotary disk 21 and moves downward to be placed on the friction members 28a of the annular locking plate 28. For this reason, the rotation of the clutch disk 27 and the blade 12 is limited due to inertia, so that the clutch disk 27 and the blades 12 stop.

Next, a travel driving system using the travel DC motor 30 will be described with reference to FIGS. 5 to 10.

As described above, the travel DC motor 30 and the speed reduction mechanism 40 are provided in the lower half of the left space, which is partitioned by the vertical partition plate 31 in the rear expansion portion 2e of the blade housing 2. Further, as shown in FIG. 7, the motor driving shaft 31 protruding from the right side of the travel DC motor 30 is inserted into the upper portion of a reduction gear case 41, and a motor driving gear 32 is fitted to the end of the motor driving shaft 31.

The driving shaft 50 passes through the lower portion of the reduction gear case 41 in a right-and-left or transverse direction. Further, two gear shafts 42 and 43 are provided between the motor driving shaft 31 and the driving shaft 50 in the reduction gear case 41. The gear shafts 42 and 43 are oriented in the right-and-left direction.

A large diameter gear 44, which is integrally fitted to a small diameter gear 45 rotatably supported by the gear shaft 42, is engaged with the driving gear 32.

A large diameter gear 46 and a small diameter 47, which are integrally formed with each other, are rotatably supported by the gear shaft 43. Further, the large diameter gear 46 is engaged with the small diameter gear 45, and the small diameter 47 is engaged with the large diameter gear 48 fitted to the driving gear 50.

The speed reduction mechanism 40 has the above-mentioned structure. The torque of the motor driving shaft 31 is transmitted to the driving shaft 50 at a reduced speed through the engagement of gears provided between the small diameter gear and the large gear.

The driving gears 61 and 61 are fitted to the both ends of the driving shaft 50 with the two-way or bi-directional clutches 55 and 55 interposed therebetween, and the driving gears 61 and 61 are engaged with the driven gears 62 and 62, which are integrally fixed to the rear wheels 7 and 7, respectively.

Accordingly, the two-way or bi-directional clutches 55 and 55 are engaged due to the driving of the travel DC motor 30, so that the rear wheels 7 and 7 are rotated and the lawn mower 1 can travel.

If the travel DC motor 30 stops operating while stop electric power has been supplied to the motor, the bi-directional clutches 55 and 55 also stop in the disengaged state. If the bi-directional clutches are in the disengaged state, the forward and backward (bi-directional) torques of the driving wheel are not transmitted to the driving shaft. It is thus possible for the operator to easily push and pull the lawn mower 1 and easily change the direction of the lawn mower.

In the body of the lawn mower 1 having the above-mentioned structure, an operation handle 80 extends rearward from the upper portion of the rear expansion portion 2e of the blade housing 2.

The operation handle 80 is a member, which is obtained by bending a tubular member in a U shape. Left and right long handgrips 81L and 81R extend rearward in an obliquely upwardly sloping manner from the left and right sides of the rear expansion portion 2e of the blade housing 2, and the rear ends of the handgrips 81L and 81R are connected with each other through a grip part 82, thereby forming the operation handle 80.

The operation handle 80 is provided with various operation members, which are operated by the operator.

Figure 8:
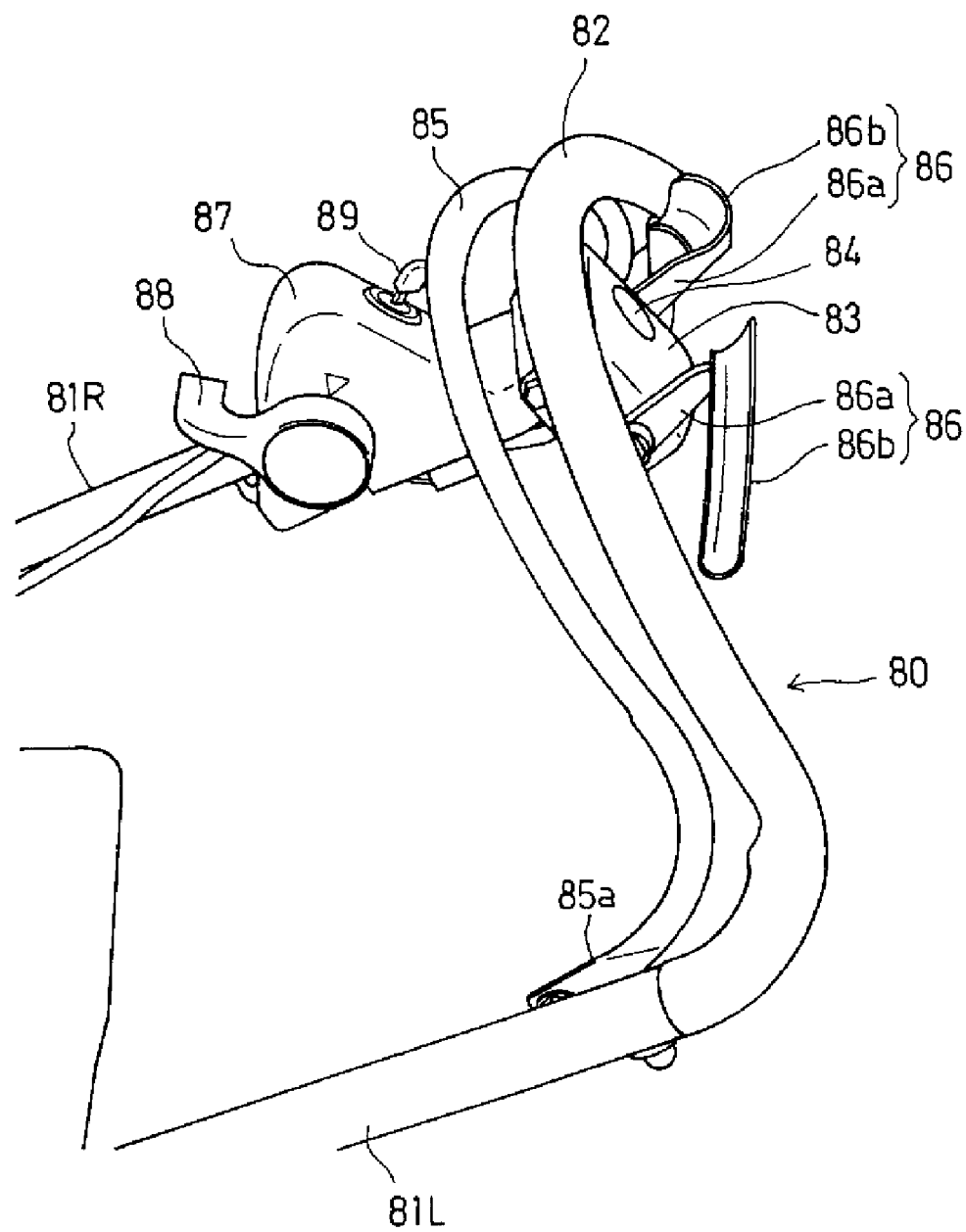
FIG. 8 is a perspective view showing the structure near a grip part of an operation handle.

Referring to FIG. 8, a first operating switch case 83 having a rectangular parallelepiped shape is fixed to a central portion of the grip part 82, which is convexly bent upward, so as to be depend downward from the central portion of the grip part. A push button 84 as a first operation member is provided on a rear surface of the first operating switch case 83.

A blade lever 85 as a second operation member is provided on the front side of the bent grip part 82 so as to be movable toward and away from the grip part 82.

A swing central shaft passes through right and left sidewalls of the first operating switch case 83. The swing central shaft has both ends thereof protruding outward. Base ends of left and right travel levers 86 and 86 are fitted to the both ends of the swing central shaft. Therefore, the left and right travel levers 86 and 86 can swing toward the rear side of the grip part 82.

Each of the travel lever 86 is composed of a swing arm 86a of which base end is fitted to the swing central shaft, and an operation portion 86b bent to the right or left from the end of the swing arm 86a.

When the left and right travel levers 86 and 86 swing forward, the operation portions 86b and 86b come into contact with the grip part 82. When the left and right travel levers swing rearward, the operation portions 86a are separated from the grip part 82.

Each of the operation portion 86b has a circular arc shape in cross-section and has the same shape as the grip part 82 so as to be fittable on the outer peripheral surface of the circular-tube-shaped grip part 82.

Further, a second operating switch case 87 is attached to the inner portion of the right long handgrip 81R near the grip part 82. Furthermore, a speed control lever 88 is provided on the left side surface of the second operating switch case 87, which has a triangular shape in a side view and can swing forward and rearward.

In addition, an ignition knob 89 is rotatably provided on the rear surface (surface facing the operator) of the second operating switch case 87.

Further, as shown in FIG. 1, a starting grip 96 is supported by a grip receiver 95, which protrudes upward from the right long handgrip 81R. A starting cable 97 extending forward from the starting grip 96, and is connected to a recoil starter (not shown) provided on the upper portion of the internal combustion engine 10.

Figure 9:
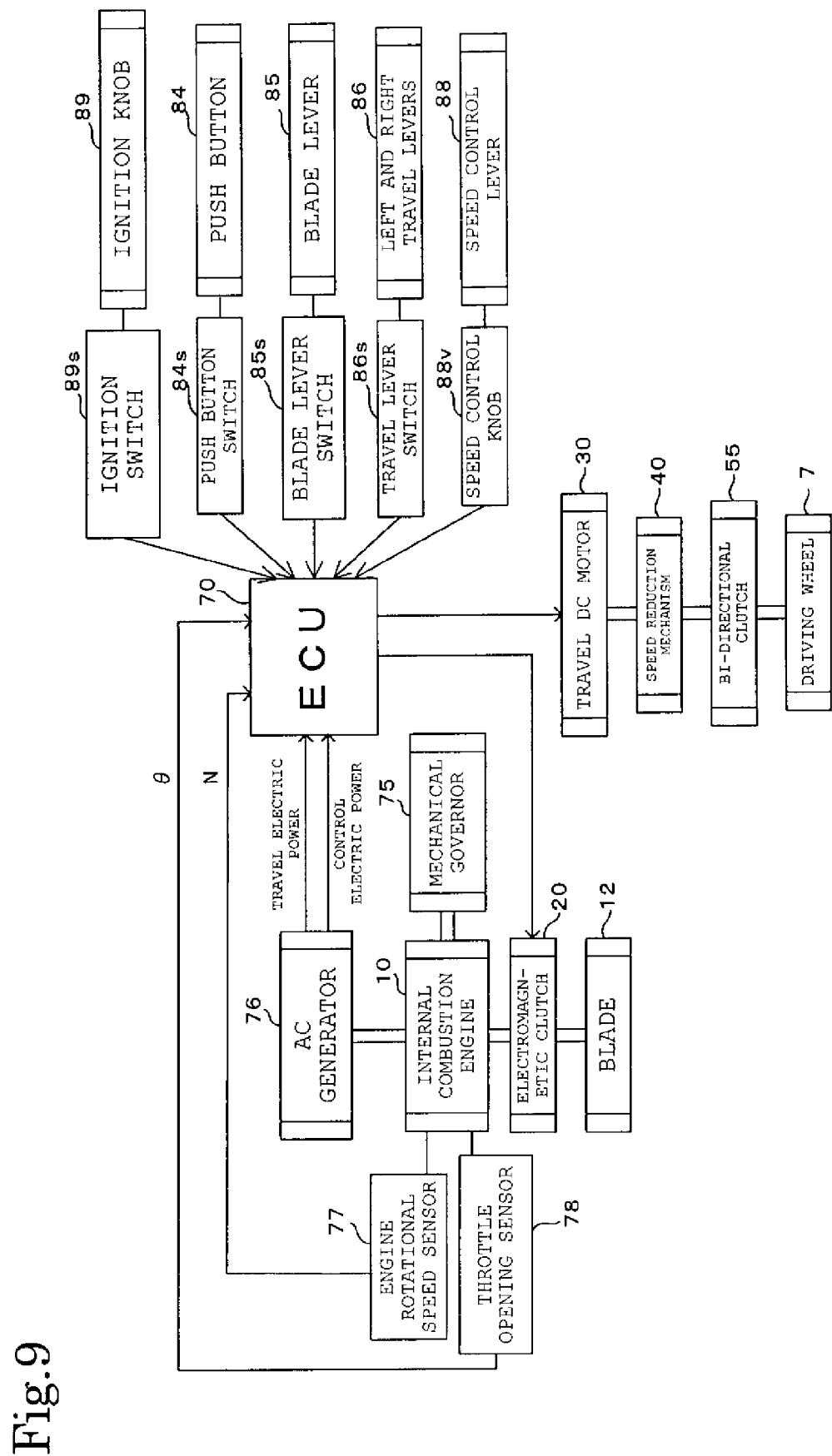
FIG. 9 is a schematic block diagram of a control system of the lawn mower.

As shown in FIG. 9, a push button switch 84s, a blade lever switch 85s, a travel lever switch 86s, a speed control knob 88v, and an ignition switch 89s are provided which are operated by the push button 84, the blade lever 85, the travel lever 86, the speed control lever 88, and the ignition knob 89. Signals from the push button switch 84s, the blade lever switch 85s, the travel lever switch 86s, the speed control knob 88v, and the ignition switch 89s are input to the ECU 70.

A schematic block diagram of a control system of the lawn mower 1 is shown in FIG. 9.

The internal combustion engine 10 is provided with a mechanical governor 75 such as a centrifugal governor that mechanically controls the throttle opening of the engine to maintain a constant engine rotational speed.

The ECU 70 controls the operation of the electromagnetic clutch 20 and the travel DC motor 30.

The internal combustion engine 10 is provided with an AC generator 76, which generates current by using the rotation of the crankshaft 11. Travel electric power of electric power generated by the AC generator 76 is supplied to the travel DC motor 30, so that the lawn mower travels. Further, electric power for control is supplied to the control system such as the electronic governor motor 75 and the ECU 70.

The ECU 70 is provided with an engine rotational speed sensor 77, which detects the operating condition of the internal combustion engine 10, and a throttle opening sensor 78, in order to control the operation of the internal combustion engine 10 and the travel DC motor 30. Data signals of the engine rotational speed detected by the engine rotational speed sensor 77 and the throttle opening detected by the throttle opening sensor 78 are input to the ECU 70.

When the ignition knob 89 is operated, the ignition switch 89s is turned on. When the travel lever 86 is operated to swing toward the grip part 82, the travel lever switch 86s is turned on. Accordingly, travel electric power generated by the AC generator 76 is supplied to the travel DC motor 30 and the travel DC motor thus begins to be operated and the lawn mower begins to travel.

If the blade lever 85 is operated to swing toward the grip part 82 after the push button 84 is depressed, the push button switch 84s and the blade lever switch 85s are sequentially turned on in this order. In this case, current is supplied to the electromagnetic clutch 20 and the electromagnetic coil 24 is energized. Accordingly, the clutch is brought into the engaged state and the blades 12 rotate and the operator can perform the mowing operation.

Figure 10:
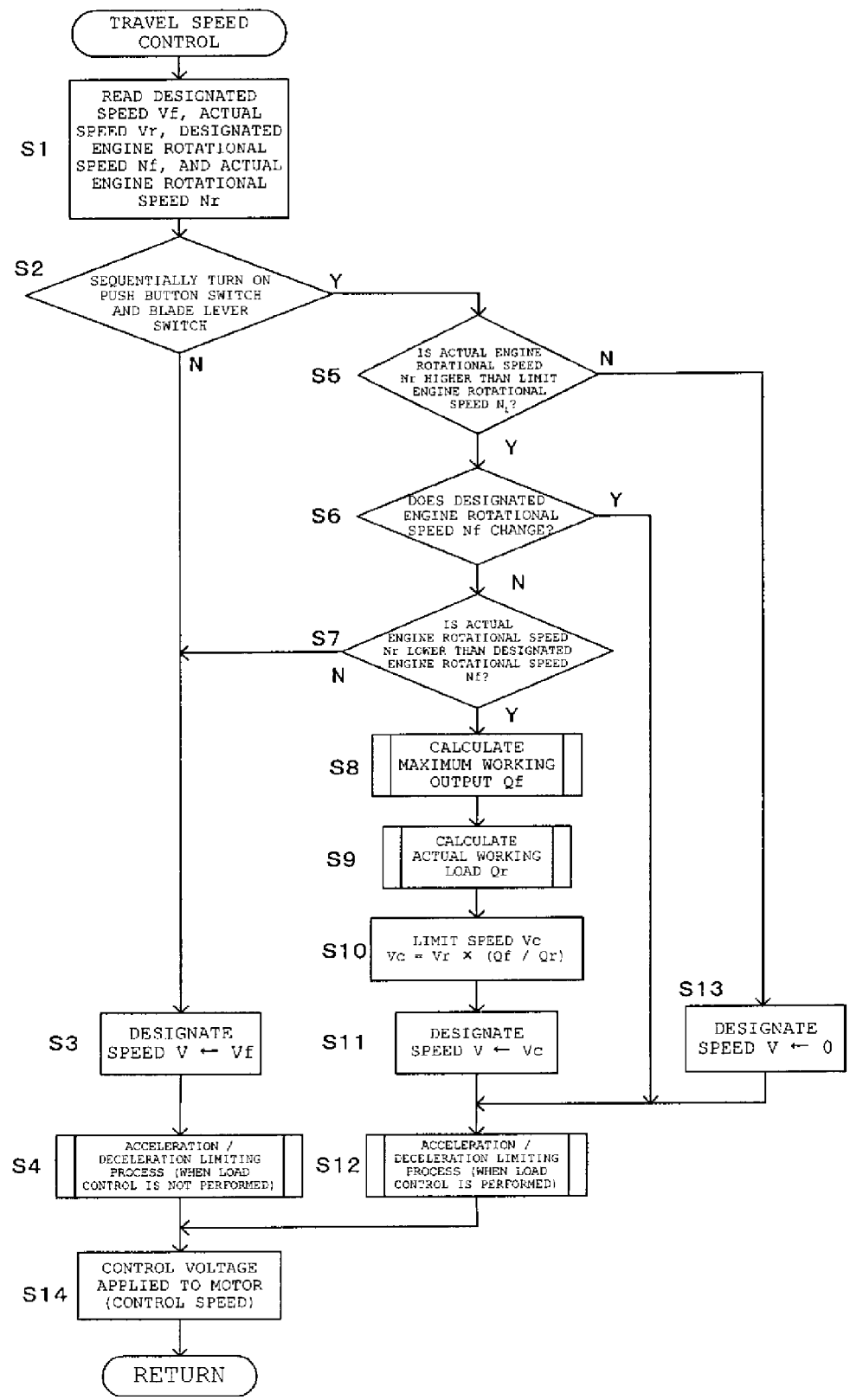
FIG. 10 is a flow chart showing a control procedure for controlling travel speed.

A control procedure, in which the travel speed is controlled when the travel lever switch 86s is turned on and the lawn mower 1 travels due to the control of the travel DC motor 30 performed by the ECU 70, will be described with reference to FIG. 10.

First, a set travel speed Vf of the lawn mower, a detected actual travel speed Vr, a set designated engine rotational speed Nf, and an actual engine rotational speed Nr detected by the engine rotational speed sensor 77 are read in step S1.

In step S2, it is determined whether the push button switch 84s and the blade lever switch 85s are sequentially turned on, in other words, whether the electromagnetic clutch 20 is engaged to rotate the blades 12 by the power of the internal combustion engine 10 and the mowing operation has thus begun.

If the mowing operation has not begun yet, the control procedure proceeds to step S3 and travel speed V is designated as the designated speed Vf. In step S4, an acceleration/deceleration limiting process for relieving a rapid speed change is performed and the control procedure proceeds to step S14, in which a voltage applied to the travel DC motor 30 is controlled, so that the lawn mower travels at a designated speed Vf' after the acceleration/deceleration limiting process. That is, when the mowing operation is not performed, the lawn mower 1 is controlled to travel at the designated speed Vf'.

Meanwhile, if it is determined in step S2 that the push button switch 84s and the blade lever switch 85s are sequentially turned on, the control procedure proceeds to step S5.

That is, if the electromagnetic clutch 20 is engaged to rotate the blades 12 by the power of the internal combustion engine 10 and the mowing operation has thus begun, the control procedure proceeds to step S5, and it is determined whether the detected actual engine rotational speed Nr exceeds a lower limit engine rotational speed $N_L$. The lower limit engine rotational speed $N_L$ is a minimum speed required to perform the mowing operation.

When the actual engine rotational speed Nr is equal to or lower than the lower limit engine rotational speed $N_L$, the control procedure proceeds to step 13 and the travel speed V is designated as 0. Then, the acceleration/deceleration limiting process is performed in step S12, the control procedure proceeds to step S14, and the operation of the travel DC motor 30 is stopped (the travel of the lawn mower is stopped).

If it is determined in step S5 that the actual engine rotational speed Nr exceeds the lower limit engine rotational speed $N_L$, the mowing operation can be performed and the control procedure proceeds to step S6.

In step S6, it is determined whether the engine rotational speed Nf is changed. That is, when the designated engine rotational speed Nf is changed, the actual engine rotational speed Nr is also changed. For this reason, in this case, the control procedure proceeds to step S12, and the designation of the travel speed is performed as described above.

When the designated engine rotational speed Nf is not changed, the control procedure proceeds from step S6 to step S7.

It is determined in step S7 whether the detected actual engine rotational speed Nr is decreased to be lower than the designated engine rotational speed Nf.

When the actual engine rotational speed Nr is lower than the designated engine rotational speed Nf, the control procedure proceeds to step S8. When the actual engine rotational speed Nr is equal to or higher than the designated engine rotational speed Nf, the control procedure proceeds to step S3.

In this case, if the actual engine rotational speed Nr rises over and falls below the designated engine rotational speed Nf, changes of the control route are frequently performed with changes in travel control. To prevent the changes of the travel control, the designated engine rotational speed Nf may have a margin so that different designated engine rotational speeds Nf are used for increase and decrease of the actual engine rotational speed Nr.

If the actual engine rotational speed Nr is equal to or higher than the designated engine rotational speed Nf, the working load of the mowing operation is not too large and the control procedure proceeds to step S3. Then, the travel speed V is designated as the set travel speed Vf and the acceleration/deceleration limiting process is performed in step S4, so that the lawn mower is controlled to travel at the designated speed Vf' after the acceleration/deceleration limiting process in step S14.

When the actual engine rotational speed Nr is decreased to be lower than the designated engine rotational speed Nf, this means that the actual engine rotational speed Nr is decreased due to a too large working load. In this case, the control procedure proceeds to from step S7 to step S8 in which a maximum working output Qf is calculated. Then, actual working load Qr is calculated in step S9.

The ECU 70, which calculates the maximum working output Qf and the actual working load Qr, has a memory in which a no-load output characteristic and a working output characteristic is previously stored. The no-load output characteristic is a relationship between engine rotational speed and no-load output during no-load (idling) operation. The working output characteristic is a relationship between the engine rotational speed and the working output for every designated engine rotational speed Nf during working. The maximum working output Qf and the actual working load Qr are calculated on the basis of the no-load output characteristic and the working output characteristic.

Figure 11:
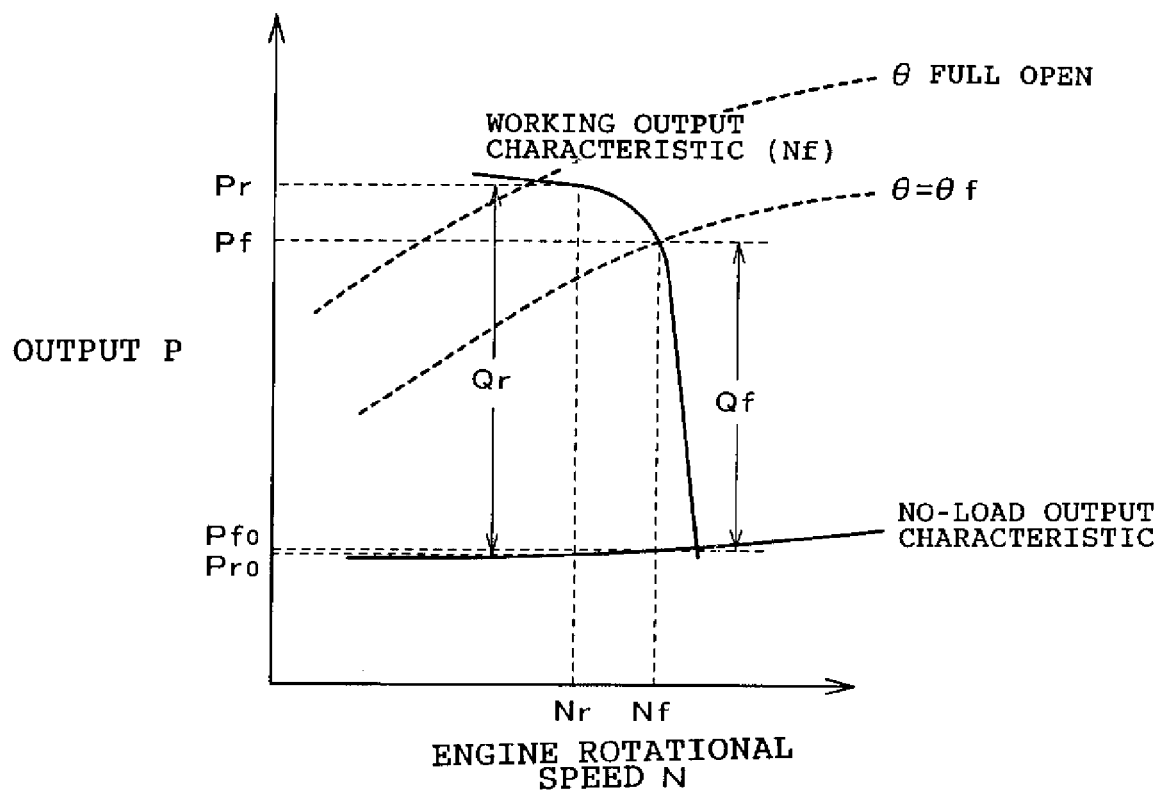
FIG. 11 shows a graph of a no-load output characteristic and a working output characteristic shown in rectangular coordinates.

The no-load output characteristic and the working output characteristic are shown in rectangular coordinates of FIG. 11 in which a horizontal axis indicates engine rotational speed N and a vertical axis indicates working output P.

The working output characteristic is a relationship between the engine rotational speed N and the working output P for a designated engine rotational speed Nf in a mechanical governor. According to the working output characteristic of the mechanical governor at a designated engine rotational speed Nf, the engine rotational speed is kept substantially constant under any load in a range with an excess output. However, at a load equal to or larger than a predetermined load, the engine rotational speed rapidly decreases.

When the engine rotational speed is decreased, the throttle opening θ is fully opened before the working output is saturated. For this reason, the throttle opening cannot be controlled, so that the internal combustion engine 10 stops running or engine stall occurs.

Therefore, if the designated engine rotational speed Nf is decreased to increase the upper limit working output, excess output will be decreased so that the throttle opening θ is fully opened and engine stall occurs if even a small engine speed drop occurs due to an instantaneous increase of load.

In contrast, if excess output is increased, the upper limit working output is significantly decreased and the working output comes to change to a large extent in response to a slight change in the engine rotational speed, whereby the extraction accuracy of the working output is deteriorated.

With respect to the calculation of the maximum working output Qf in step S8, a working output Pf is first obtained from the designated engine rotational speed Nf on the basis of the working output characteristic shown in FIG. 11. Then, a no-load output $Pf_0$ is obtained from the designated engine rotational speed Nf on the basis of the no-load output characteristic. The maximum working output Qf ($=Pf-Pf_0$), which is an output only for the mowing operation, is calculated by subtracting the no-load output $Pf_0$ from the working output Pf.

With respect to the calculation of the actual working load Qr in step S9, a working output Pr is obtained from the actual engine rotational speed Nr on the basis of the working output characteristic shown in FIG. 11. Then, an actual no-load output $Pr_0$ is obtained from the actual engine rotational speed Nr on the basis of the no-load output characteristic. The actual working load Qr ($=Pr-Pr_0$), which is applied only in the mowing operation, is calculated by subtracting the no-load output $Pr_0$ from the working output Pr.

Further, in step S10, a limit speed Vc is calculated from the actual working load Qr and the maximum working output Qf, which have been calculated in steps S8 and S9.

The limit speed Vc ($=Vr\times(Qf/Qr)$) is calculated by multiplying an actual speed Vr, which is the present travel speed, by a ratio (load ratio Qf/Qr) of the maximum working output Qf to the actual working load Qr.

In next step S11, the travel speed V is designated as the limit speed Vc, and the acceleration/deceleration limiting process is performed in step S12. Then, the lawn mower is controlled in step 14 to travel at a limit speed Vc' after the acceleration/deceleration limiting process.

While the internal combustion engine 10 is operated at the designated engine rotational speed Nf and the lawn mower 1 is thus performing the mowing operation, the lawn mower steadily travels at the set speed Vf. In this case, steps S1, S2, S5, S6, S7, S3, S4, and S14 are repeatedly performed through a route in which the control procedure proceeds from step S7 to step S3.

In this state, if the lawn mower 1 reaches a grassy area, the working load is increased and the actual engine rotational speed Nr is thus decreased to be lower than the designated engine rotational speed Nf. In this case, the control procedure proceeds from step S7 to step S8, and steps S1, S2, S5, S6, S7, S8, S9, S10, S1, S12, and S14 are repeatedly performed.

That is, in steps S8 and S9, the load ratio of Qf/Qr is calculated using the actual working load Qr and the maximum working output Qf, which are calculated on the basis of the no-load output characteristic and the working output characteristic shown in FIG. 11. Then, the value of $Vr\times(Qf/Qr)$, which corresponds to the load ratio Qf/Qr of the actual speed Vr, is used as the limit speed Vc (<Vr). Further, the travel speed is controlled so as to be decreased from the present actual speed Vr to the limit speed Vc.

The working load is decreased to be appropriate by decreasing the travel speed as described above, so that the operator can smoothly perform the mowing operation and maintain excellent finish of the working.

It is possible to relieve operator's work burden by using the simple structure and control where the travel speed is automatically controlled to allow the working load to become appropriate.

The acceleration/deceleration limiting process, which is performed in step S4 and step S12 to relieve rapid speed change, will be described below.

The travel speed V is set or designated in steps S3, S11 and S13. The designated speed V is designated in every calculation cycle, and the acceleration/deceleration limiting process is performed with respect to the designated speed V, so that the lawn mower is controlled to travel at a designated speed V' after the acceleration/deceleration limiting process.

If the previous actual speed Vr before one calculation cycle is used as the travel speed V, the speed will be rapidly changed as a speed difference $\Delta V$ ($=|V-Vr|$) between the present designated speed V and the previous actual speed Vr increases. For this reason, the speed difference $\Delta V$ must be limited.

When the speed is increased, the speed difference $\Delta V$ is limited by using an addition limit value dVa. That is, when the speed difference $\Delta V$ exceeds the addition limit value dVa, a speed obtained by adding the addition limit value dVa to the previous actual speed Vr is used as the designated speed V' ($=Vr+dVa$) after the process.

Meanwhile, when the speed is decreased, the speed difference $\Delta V$ is limited by using a subtraction limit value dVs. That is, when the speed difference $\Delta V$ exceeds the subtraction limit value dVs, a speed obtained by subtracting the subtraction limit value dVs from the previous actual speed Vr is used as the designated speed V' ($=Vr-dVs$) after the process.

The subtraction limit value dVs is set larger than the addition limit value dVa. Thus, when the speed is to be decreased, there is a less limitation so that the speed is decreased considerably. Consequently, the occurrence of engine stall due to lack and delay of sufficient speed reduction is prevented.

Figure 12:
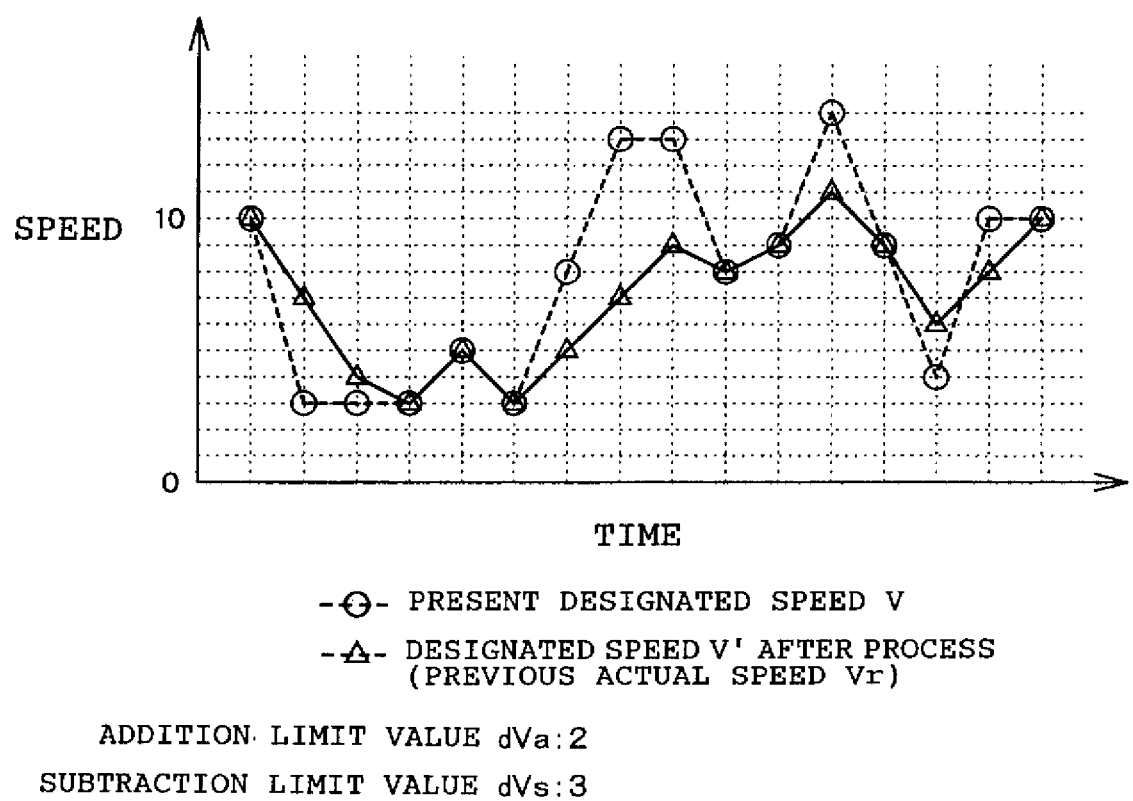
FIG. 12 is a graph showing speed changes caused by an acceleration or deceleration limiting process.

FIG. 12 shows an example of the acceleration/deceleration limiting process, and shows changes of the present designated speed V in every calculation cycle and changes of the designated speed V' (previous actual speed Vr) after the process.

A dotted bent-line indicates the present designated speed V, and a solid bent-line indicates the designated speed V' after the process.

One scale on the horizontal axis indicating time is a calculation cycle, and one scale on the vertical axis indicating speed corresponds to a speed 1. In this case, the addition limit value dVa is 2, and the subtraction limit value dVs is 3.

Therefore, if speed increase is so designated that the present designated speed V exceeds the previous actual speed Vr by 2, the designated speed V' after the process is suppressed to be given a speed increase 2. If speed reduction is so designated that the present designated speed V exceeds the previous actual speed Vr by 3, the designated speed V' after the process is suppresses to be given a speed reduction 3. As a result, the rapid speed changes are suppressed.

The acceleration/deceleration limiting process in step S12 performed when the mowing operation has started, is carried out when the load control is performed. On the other hand, the acceleration/deceleration limiting process in step S4 performed when the mowing operation has not yet begun, is carried out when the load control is not performed. The degrees of limiting values, that is, limit values of the processes are different in theses two steps.

Figure 13:
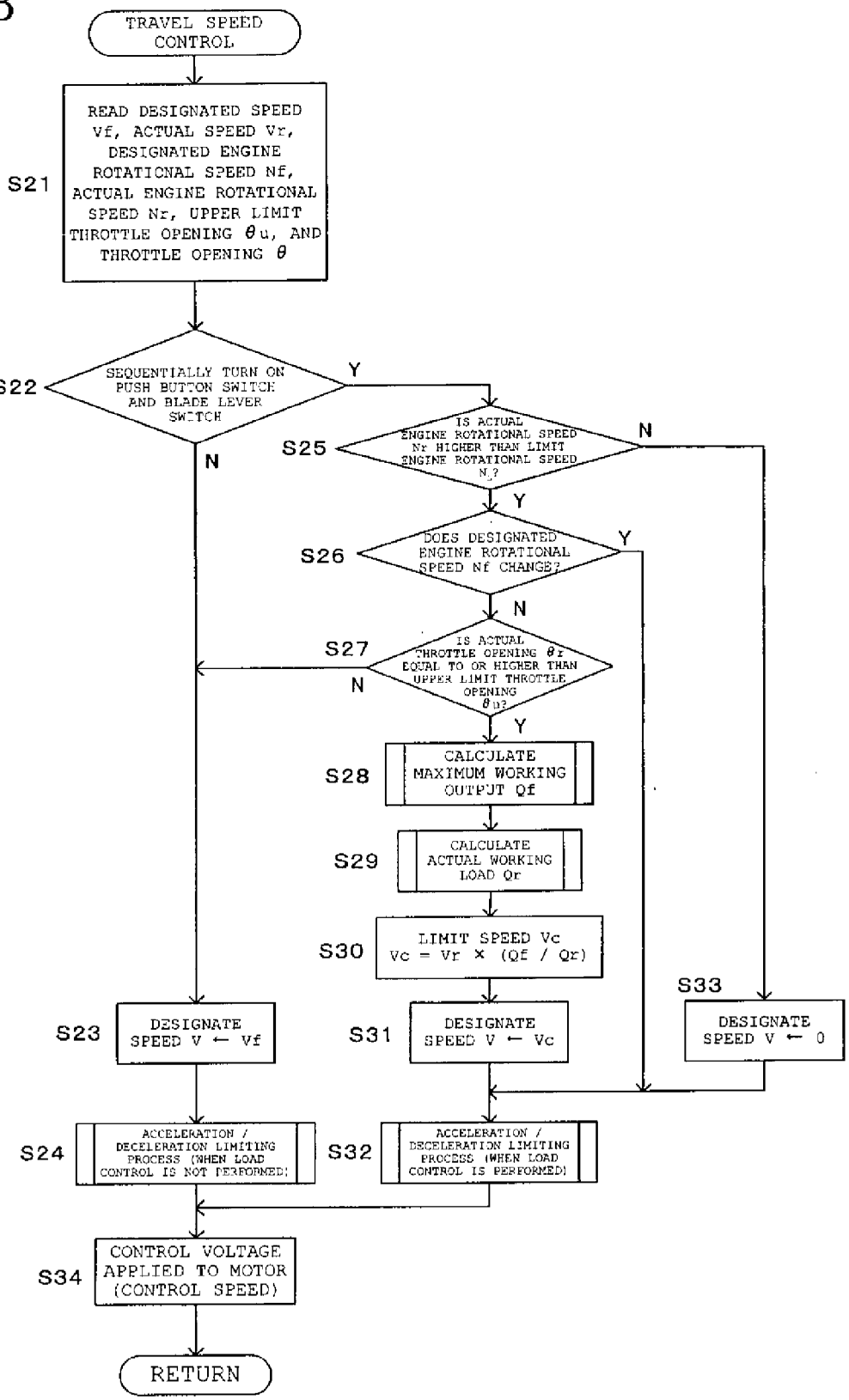
FIG. 13 is a flow chart showing a control procedure for controlling travel speed in a load control mechanism according to another embodiment.

Another embodiment of the invention will be described below with reference to FIGS. 13 and 14.

The internal combustion engine used in this embodiment has an electronic governor instead of the mechanical governor, and a throttle valve opening is controlled by the operation of the motor to maintain the engine rotational speed at constant value.

According to the electronic governor, independently of changes of the working load, the throttle valve opening is controlled by the ECU so that the engine rotational speed is maintained constant.

A control procedure for controlling travel speed according to this embodiment will be described with reference to FIG. 13.

In step S21, the set travel speed Vf, the actual travel speed Vr, the designated engine rotational speed Nf, the actual engine rotational speed Nr, a set upper limit throttle opening θu (for example, opening of 80%), and an actual throttle opening θr detected by the throttle opening sensor 78 are read.

Steps S22, S23, S24, S25 and S26 are the same as steps S2, S3, S4, S5 and S6, respectively.

When the push button switch 84s and the blade lever switch 85s are sequentially turned on and the mowing operation starts, the control procedure proceeds from step S22 to step S25. Further, when the actual engine rotational speed Nr exceeds the lower limit engine rotational speed $N_L$ that is a minimum speed required to perform the mowing operation, the control procedure proceeds to step S26. Furthermore, when the designated engine rotational speed Nf is not changed and the control procedure proceeds to step S27, it is determined whether the actual throttle opening θr is equal to or larger than the upper limit throttle opening θu.

If the actual throttle opening θr is equal to or larger than the upper limit throttle opening θu, the control procedure proceeds to step S28. Further, if the actual throttle opening θr is smaller than the upper limit throttle opening θu, the control procedure proceeds to step S23.

In this case, if the actual throttle opening θr rises over and falls below the upper limit throttle opening θu, control route will change frequently and there will occur changes in travel control. To prevent the changes in the travel control, the upper limit throttle opening θu may have a margin so that the upper limit throttle opening θu is changed depending on increase and decrease of the actual throttle opening θr.

If the actual throttle opening θr is smaller than the upper limit throttle opening θu, this means that the working load on the mowing operation is not too large and the control procedure proceeds to step S23. Then, the travel speed V is designated as the set or designated speed Vf and an acceleration/deceleration limiting process is performed in step S24, so that the lawn mower is controlled to travel at a designated speed Vf' after the acceleration/deceleration limiting process in step S34.

If the actual throttle opening θr is equal to or larger than the upper limit throttle opening θu, this means that the throttle opening θ has been enlarged due to a too large working load and there is only a little margin to a state in which the throttle opening is fully open. Thus there is a possibility that the engine stall occurs. Accordingly, in this case, the control procedure proceeds from step 27 to step S28, and a maximum working output Qf is calculated. Then, an actual working load Qr is calculated in step S29.

The ECU, which calculates the maximum working output Qf and the actual working load Qr, has a memory in which a no-load output characteristic and a working output characteristic are previously stored. The no-load output characteristic is a relationship between engine rotational speed and no-load output during the no-load (idling) operation. The working output characteristic is a relationship between the throttle opening θ and the working output for every designated engine rotational speed Nf during the working. The maximum working output Qf and the actual working load Qr are calculated on the basis of the no-load output characteristic and the working output characteristic.

The no-load output characteristic is the same as the no-load output characteristic (see FIG. 11) of the above-mentioned embodiment, and is shown in rectangular coordinates of FIG. 14(1) where the horizontal axis indicates engine rotational speed N and the vertical axis indicates output P.

The working output characteristic is a relationship between the throttle opening θ and the working output P for the set or designated engine rotational speed Nf, and is shown in the rectangular coordinates of FIG. 14(2).

With respect to the calculation of the maximum working output Qf in step S28, the working output Pu is first obtained from the upper limit throttle opening θu on the basis of the working output characteristic shown in FIG. 14(2). Then, a no-load output $Pf_0$ is obtained from the designated engine rotational speed Nf on the basis of the no-load output characteristic shown in FIG. 14(1). The maximum working output Qf ($=Pu-Pf_0$), which is an output only for the mowing operation, is calculated by subtracting the no-load output $Pf_0$ from the working output Pu.

With respect to the calculation of the actual working load Qr in step S29, a working output Pr is obtained from the actual throttle opening θr on the basis of the working output characteristic (see FIG. 14(2)). Then, an actual no-load output $Pr_0$ ($=Pf_0$) is obtained from the actual engine rotational speed Nr (which is the same as the designated engine rotational speed Nf) on the basis of the no-load output characteristic shown in FIG. 14(1). The actual working load Qr ($=Pr-Pr_0$), which is applied only in the mowing operation, is calculated by subtracting the no-load output $Pr_0$ from the working output Pr.

In step S30, a limit speed Vc is calculated from the actual working load Qr and the maximum working output Qf, which are calculated in steps S28 and S29.

A calculating method is the same as that in step S10. Further, the limit speed Vc ($=Vr \times (Qf/Qr)$) is calculated by multiplying an actual speed Vr by a ratio (load ratio Qf/Qr) of the maximum working output Qf to the actual working load Qr.

In step S31, the travel speed V is designated as the limit speed Vc, and the acceleration/deceleration limiting process is performed in step S32. Then, the lawn mower is controlled to travel at a limit speed Vc' after the acceleration/deceleration limiting process in step S34.

While the internal combustion engine is operated at the designated engine rotational speed Nf and the lawn mower 1 is thus performing the mowing operation, the lawn mower steadily travels at the set or designated speed Vf. In this case, steps S21, S22, S25, S26, S27, S23, S24, and S34 are repeatedly performed through the route in which the control procedure proceeds to from step S27 to step S23.

That is, in steps S28 and S29, the load ratio of Qf/Qr is calculated using the actual working load Qr and the maximum working output Qf, which is calculated on the basis of the no-load output characteristic and the working output characteristic shown in FIGS. 14(1) and 14(2). Then, the value of Vrx(Qf/Qr), which corresponds to the load ratio Qf/Qr of the actual speed Vr, is used as the limit speed Vc (<Vr). Further, the travel speed is controlled so as to be decreased from the present actual speed Vr to the limit speed Vc.

The working load is decreased to be appropriate by decreasing the travel speed as described above, so that the operator can smoothly perform the mowing operation and maintain excellent finish of the working.

It is thus possible to reduce operator's work burden by using the simple structure and control where the travel speed is automatically controlled to make the working load appropriate.

The invention has been applied to a self-propelled lawn mower in the above-mentioned embodiments. However, the invention is not limited to a lawn mower, and may be applied to various self-propelled working machines.

What is claimed is:

1. A load control mechanism for a self-propelled working machine that performs work by using power of an internal combustion engine, travels by using power of an electric motor, and includes a governor for maintaining the internal combustion engine at a designated engine rotational speed, wherein:
   the governor is a mechanical governor that mechanically controls a throttle opening of the internal combustion engine; and
   the load control mechanism comprises:
   a maximum working output calculating means that calculates a maximum working output from the designated engine rotational speed;
   an actual working load calculating means that calculates an actual working load from the designated engine rotational speed and a detected actual engine rotational speed;
   a limit speed calculating means that calculates a limit speed from the maximum working output and the actual working load; and
   a travel controller that operates and controls the electric motor by setting a travel speed to the limit speed when the actual engine rotational speed is decreased to be lower than the designated engine rotational speed.

2. The load control mechanism for the self-propelled working machine according to claim 1, wherein:
   the maximum working output calculating means and the actual working load calculating means previously store a no-load output characteristic, which is a relationship between engine rotational speed and no-load output during a no-load driving, and a working output characteristic, which is a relationship between engine rotational speed and working output for every designated engine rotational speed during working, and
   the maximum working output calculating means and the actual working load calculating means calculate the maximum working output and the actual working load on the basis of the no-load output characteristic and the working output characteristic.

3. A load control mechanism for a self-propelled working machine that performs work by using power of an internal combustion engine, travels by using power of an electric motor, and includes a governor for maintaining the internal combustion engine at a designated engine rotational speed, wherein:
   the governor is an electronic governor that electronically controls a throttle opening of the internal combustion engine; and
   the load control mechanism comprises:
   a maximum working output calculating means that calculates a maximum working output from an upper limit throttle opening and the designated engine rotational speed;
   an actual working load calculating means that calculates an actual working load from the designated engine rotational speed and a detected actual throttle opening;
   a limit speed calculating means that calculates a limit speed from the maximum working output and the actual working load; and
   a travel controller that operates and controls the electric motor by setting a travel speed to the limit speed when the actual throttle opening is increased to be equal to or higher than the upper limit throttle opening.

4. The load control mechanism for the self-propelled working machine according to claim 3, wherein:
   the maximum working output calculating means and the actual working load calculating means previously store a no-load output characteristic, which is a relationship between engine rotational speed and no-load output during no-load driving, and a working output characteristic, which is a relationship between a throttle opening and a working output for every specific engine rotational speed during working; and
   the maximum working output calculating means and the actual working load calculating means calculate the maximum working output and the actual working load on the basis of the no-load output characteristic and the working output characteristic.

* * * * *